Nov. 15, 1955   M. E. WALBERG   2,723,613
DRAWBAR MOUNTING FOR AGRICULTURAL IMPLEMENTS
Filed May 1, 1952   2 Sheets-Sheet 1

Inventor
Maynard E. Walberg
by
Attorney

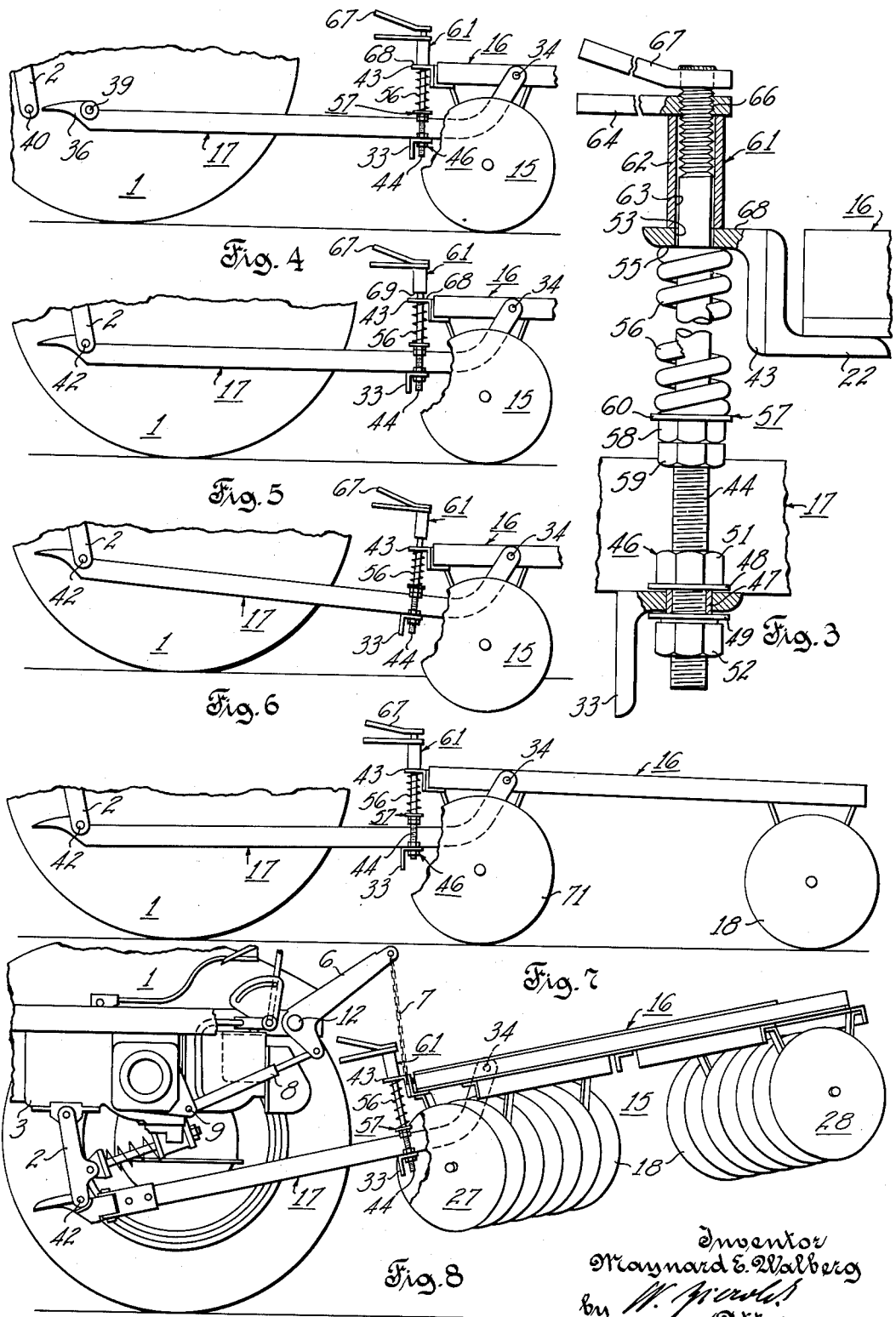

United States Patent Office 2,723,613
Patented Nov. 15, 1955

2,723,613

DRAWBAR MOUNTING FOR AGRICULTURAL IMPLEMENTS

Maynard E. Walberg, La Crosse, Wis., assignor to Allis-Chalmers Manufacturing Company, Milwaukee, Wis.

Application May 1, 1952, Serial No. 285,393

8 Claims. (Cl. 97—46.33)

This invention relates generally to agricultural implements, and it is more particularly concerned with a soil working implement of the type in which front and rear tools are mounted on a rigid frame structure for simultaneous soil penetration while the implement is being advanced by a tractor to which it is hitched in vertically floating condition.

In agricultural implements of this type, as for instance tandem disk harrows, it is desirable to maintain both the front and the rear tools in proper soil penetrating condition irrespective of irregularities of the ground contour, and also to provide for vertically angular adjustment of the implement frame to a position affording the desired depth of soil penetration of the front and rear tools. In tandem disk harrows, in particular, it may sometimes also be desirable to employ forwardly mounted disks which are of larger diameters than the rearwardly mounted disks.

Generally, it is an object of this invention to provide an improved agricultural implement of the hereinabove outlined character, and more particularly one wherein all of the mentioned requirements are taken care of in a practical and entirely satisfactory manner.

One of the more specific objects of this invention is to provide a trail behind implement of the hereinabove outlined character wherein the implement frame and an associated draft tongue are connected in an improved manner for vertical angular movement relative to each other.

A further object of this invention is to provide an implement of the hereinabove outlined character incorporating an improved mechanism for yieldably maintaining the rearwardly mounted ground engaging tools at a desired cutting depth relative to the forwardly mounted tools.

A still further object of the invention is to provide an implement incorporating a depth regulating mechanism of the hereinabove mentioned character and wherein provision is made for adapting the implement to use in connection with different tractor models.

Another object of this invention is to provide an implement of the hereinabove outlined character wherein resilient means are effective under normal operating conditions to impose a vertical load on the implement draft tongue and wherein a mechanism is provided to relieve the implement draft tongue from said load for the purpose of facilitating coupling of the implement with and its uncoupling from a draft vehicle.

The foregoing and other objects and advantages are attained by the present invention, various novel features of which will become apparent from the description and drawings herein and will be more particularly pointed out in the appended claims.

In the drawings:

Fig. 3 is an enlarged view, partly in section, of a connecting rod and associated parts incorporated in the harrow shown in Figs. 1 and 2;

Fig. 4 is a fractional, somewhat schematic side view of tractor and harrow parts shown in Fig. 1, and illustrating a step in the process of hitching the harrow to a tractor;

Fig. 5 is a view similar to Fig. 4 with the harrow attached to the tractor and resting on the ground;

Fig. 6 is a view similar to Fig. 4 and illustrates the harrow lowered to a soil penetrating position;

Fig. 7 is a side view of a harrow having front disks of larger diameter than the rear disks, and hitched to a tractor in a position corresponding to the position of the harrow shown in Fig. 1; and Fig. 8 is a side elevation of the tractor part and harrow shown in Fig. 1, with the harrow raised to transport position.

Figures 1, 2:
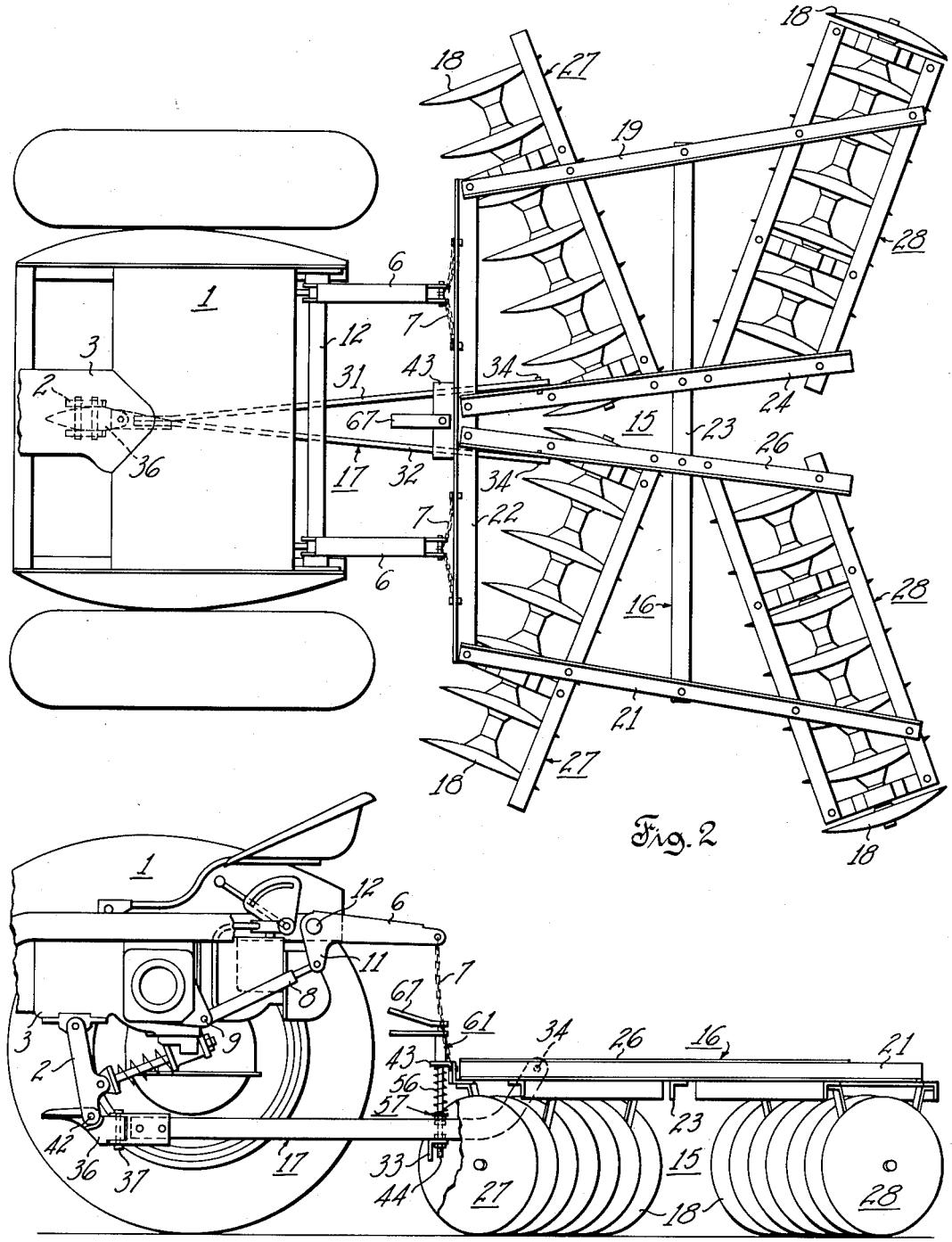
Fig. 1 is a side elevation of a tandem disk harrow embodying the present invention, and of the rear part of a tractor to which the harrow is attached.
Fig. 2 is a top view of the harrow and rear tractor part shown in Fig. 1.

Referring to Figs. 1 and 2, a conventional wheel type tractor 1 has a hitch yoke 2 depending from its main body 3, and a pair of lift levers 6 disposed on the rear of the tractor and adapted for connection with a trailing implement by means of lift chains 7. The lift levers 6 are connected with a conventional actuating mechanism comprising an extensible power actuated ram 8 which is mounted on the tractor by a pivot pin 9 and hinged to an arm 11 of one of the lift levers 6.

As shown in Figs. 1 and 2, a tandem disk harrow generally designated by the reference character 15 comprises a rigid frame structure 16, a draft pole or tongue 17, and front and rear disk gangs 27 and 28, each being made up of a series of disks 18.

As shown in Fig. 2, the rigid frame 16 comprises outside frame members 19 and 21 spaced apart in rearwardly diverging relation to each other by transversely disposed frame members 22 and 23. A pair of inside frame members 24 and 26 are also held rigidly apart in rearwardly diverging relation to the center line of the implement and to each other by the transverse frame members 22 and 23.

The front and rear disk gangs 27 and 28 are rotatably mounted in conventional manner on the frame 16 for rotation on relatively fixed diverging axes.

The draft tongue 17 comprises a pair of side members 31 and 32 which are rigidly united at their forward ends and extend rearwardly in diverging relation to each other. At an intermediate portion of the draft tongue, the side members 31 and 32 are spaced rigidly apart by means of a tie bar 33 in the form of an angle iron, which has a horizontal flange rigidly secured at its opposite ends, as by welding, to the side members 31 and 32. Rearward portions of the tongue side members are curved upwardly and are pivotally connected at their free ends to a forward position of the frame 16 by pivot means including pins 34. The pins afford a transverse horizontal axis for vertical swinging movement of the tongue 17 relative to the implement frame 16. As shown in Figs. 1 and 2, a hitch knuckle 36 is pivotally mounted on the forward end of the tongue 17 by means of a vertically disposed pin 37, and as indicated in Fig. 4, the knuckle 36 is also provided with a horizontal transverse aperture 39 for alignment with apertures 40 in the tractor mounted hitch yoke 2. In the condition of the parts as shown in Figs. 1, 2 and 5 to 8, a coupling pin 42 is inserted into the aligned openings 39 and 40 of the hitch yoke 2 and hitch knuckle 36 to complete the draft connection between the tractor and the harrow. It will be noted that the coupling pin 42 affords a horizontal axis for vertical swinging of the tongue 17 relative to the tractor.

Referring to Figs. 1 and 2, an angle iron clip 43 which forms a spring bracket and stop member is rigidly secured to the central portion of the forward frame member 22.

The clip 43 is positioned on the frame directly above the tie bar 33 which is in turn secured to the tongue 17. The clip 43 and the tongue tie member 33 are provided with vertically aligned apertures for receiving a thrust transmitting element or rod 44.

The rod 44 and associated parts are shown enlarged in Fig. 3, and it will be seen that the lower end of the rod 44 is connected to the tie bar 33 by means of an attaching unit generally indicated by the reference character 46 and which comprises a bushing 47, washers 48 and 49 and nuts 51 and 52 threadedly engaged with a lower part of the rod 44. The bushing 47 is unthreaded and inserted in the aperture in the tie bar 33, and the washers 48 and 49 are positioned on the rod 44 between the nuts 51 and 52 to engage, respectively, the top and bottom edges of the bushing 47. The nuts 51 and 52 are screwed on the rod toward each other so as to force the washers into engagement with top and bottom portions of the bushing 47 and through the resulting reaction lock the attaching unit 46 in axially fixed position on the rod 44. It will be noted that the length of the bushing 47 is somewhat greater than the thickness of the horizontal flange of the tie bar 33, and that the bushing holds the washers 48 and 49 in rigidly spaced relation to each other with washer 48 above and washer 49 below the horizontal flange of the tie bar 33. The connection afforded by the attaching unit 46 permits both vertical adjustment and limited tilting of the rod 44 relative to the tie member 33. The bushing 47 also protects the threads on the lower portion of the rod 44 within the hole of the tie bar 33.

The upper portion of the rod 44 is slidably received in an aperture 53 of the angle clip 43 and with stop member 61 provides a lost motion connection operatively interposed between the forward end of the implement frame and a portion of the draft tongue forwardly of the pivot center provided by pins 34. Resilient means comprising a relatively strong coil spring 56 is positioned to surround an intermediate portion of the rod 44 and is disposed to react between a downwardly facing thrust surface 55 of the clip 43 and an upwardly facing spring seat 57 on the rod 44. The spring seat comprises a pair of nuts 58 and 59 in cooperative engagement with the threaded lower portion of the rod 44 above the nut 51, and a washer 60 surrounding the rod 44 between the lower end of the spring 56 and the upper surface of the nut 58. It will be noted that the spring seat 57 afforded by the nuts 58, 59 and washer 60 is adjustable longitudinally of the rod 44 and that the compression of the spring 56 may be increased or decreased by upward and downward adjustment, respectively, of the spring seat 57 on the rod 44.

A stop element or collar 61 is threadedly connected to the upper end of the rod 44 which extends above the angle clip 43. The stop element 61 comprises a sleeve part or tube 62 which has an inner cylindrical surface 63 of larger diameter than the outside diameter of the rod 44, and a handle 64 is rigidly attached to the upper end of the tube 62. The handle 64 has a threaded opening 66 in alignment with the axis of the tube 62, and the internal threads of the opening 66 are engaged with the external threads at the upper part of the rod 44. It will be noted that longitudinal adjustment of the collar 61 relative to the rod 44 may be effected by utilizing the handle 64 to rotate the collar 61 about the rod 44.

Another handle 67 is rigidly secured to the upper end of the rod 44. This handle may be utilized to hold the rod in a stationary position during turning of the collar 61 on the rod 44.

Referring again to Figs. 1 and 2, it will be seen that a load transmitting lift connection between the tractor 1 and the harrow 15 is provided by the chains 7 which as stated are connected at their upper ends to the lift levers 6 and the lower ends of which are connected with front frame bar 22.

In Fig. 4, the harrow 15 is shown resting on level ground in a position preparatory to hitching it to the tractor 1, and in such preparatory position of the harrow the stop collar 61 is adjusted to a downward position on the rod 44, as shown in Fig. 4, in which it is spaced a substantial distance from the handle 67, and in which it is contacted by the upper surface 68 of the angle clip 43. Vertical adjustment of the forward end of the tongue 17 is accomplished by adjusting the nuts 51 and 52 of the attaching unit 46 so that the hitch knuckle 36 of the tongue is held in the proper vertical relationship to the tractor mounted hitch yoke 2, for positioning the apertures 39 and 40 on a common horizontal level. The tractor may then be moved rearwardly until the apertures 40 and 39 in the tractor hitch yoke 2 and in the implement hitch knuckle 36, respectively, are in transverse pin receiving alignment. Insertion of the coupling pin 42 into the aligned apertures and connection of the chains 7 completes the hitching of the harrow to the tractor.

In Fig. 5, the harrow is shown with the draft connection between the tractor and the harrow completed. However, it will be noted that in Fig. 5 the stop member 61 is adjusted upwardly on the rod 44 so that the lower edge 69 of the tube 62 is spaced a substantial distance from the top surface 68 of the angle clip 43. With the parts adjusted as shown in Fig. 5, the spring 56 reacts between the angle clip 43 and the spring seat 57, with the result that the tongue 17 is subjected to a strong downward force which tends to swing it downwardly relative to the harrow frame 16 on the axis of the pivot pins 34. Since the forward end of the tongue 17 is connected to the tractor and is thereby prevented from moving downwardly, the spring 56 is effective to subject the harrow frame 16 to vertical rearward tilting on the axis of the pivot pins 34 and thereby urge the rearwardly mounted disk gangs 28 downwardly. The spring tension and therefore the amount of load or force imposed on the rear disk gangs 28 may be varied to suit prevailing conditions, by adjusting the spring seat 57 upwardly or downwardly on the rod 44.

In Fig. 6, the rod 44, spring 56 and stop 61 are shown in positions occupied when the harrow is in a soil penetrating condition, and in which the chains 7 are slack. It will be noted that the tongue 17 may pivot about the coupling pin 42, and that the frame 16 may pivot about the pins 34. The two pivot axes provided by the coupling pin 42 and by the pins 34 permit the necessary vertical angular movement of the frame 16 which enables the front and rear disk gangs 27 and 28, to follow undulations of the ground over which the harrow is advanced by the tractor. In Fig. 6, it will be seen that the downward tilting of the front of frame 16 on the axis of the pivot pins 34 is resiliently opposed by the spring 56, and that downward tilting of the rear frame 16 on the axis of pivot pins 34 is limited by engagement of the angle clip 43 with the upwardly adjusted collar 61. The front and rear disk gangs 27 and 28 may thus remain in proper soil penetrating positions on undulating ground.

When it is desired to transport the harrow or to raise the disks out of engagement with the ground, the operator may actuate the lift arms 6 by admitting fluid pressure to the ram 8 (Figs. 1 and 8). Such admission of fluid pressure will extend the ram so as to swing the lift levers 6 upwardly about the pivot 12. Upward movement of the lift lever 6 first takes up the slack of the chains 7 and then raises the frame 16. The initial lifting of the frame 16 brings the upper surface 68 of the angle clip 43 into contact with the stop collar 61, and continued upward movement of the lift levers 6 and of the chains 7 will cause upward swinging movement of both the frame 16 and the tongue 17 as a unit about the coupling pin 42 until the transport position shown in Fig. 8 is attained.

In unhitching the implement from the tractor, it is necessary to neutralize the spring load which tends to force the forward end of the tongue 17 downwardly relative to the hitch yoke 2 on the tractor. In the normal working condition of the harrow as shown in Fig. 5, the spring 56 is effective to impose a heavy downward load on the tongue 17, and such downward load would make it very difficult to withdraw the coupling pin 42. To neutralize the spring load for unhitching purposes, it is necessary to adjust the collar 61 downwardly on the rod 44 from the position shown in Fig. 5 until the collar comes into contact with the upper surface 68 of the angle clip 43 and the entire spring load is transferred from the draft tongue 17 to the harrow frame 16, as shown in Fig. 1. With the stop in this position, the spring load effective on the rod 44 is taken up by contact of the stop 61 with the angle clip 43, instead of being taken up by the tongue 17 and tractor, as in ordinary operation and as illustrated in Fig. 5. With the spring load removed from the draft tongue 17, the coupling pin 42 may be easily withdrawn from the hitch yoke 2 and hitch knuckle 36. Disconnecting the chains 7 from the lift levers 6 completes unhitching of the harrow from the tractor, and the tractor may be driven away while the harrow remains lying on the ground in the condition in which it is shown in Fig. 4. It will be observed that the stop 61 is effective through the rod 44 and tongue attaching unit 46 to support the tongue 17 relative to the frame 16, and that the tongue will be maintained in position for rehitching to the tractor.

Under certain conditions, such as working in soils containing highly abrasive materials, it may be desirable to use front mounted disks having larger diameters than the rear mounted disks, and Fig. 7 shows a harrow having front disks 71 which are larger than the rear disks 18. As shown in Fig. 7, the harrow rests on level ground, and it will be noted that the front end of the frame 16 is positioned on a higher level than the rear part of the frame. The rod 44 and associated parts described hereinbefore make it possible to properly position the tongue 17 of the harrow shown in Fig. 7 relative to the hitch yoke 2 and the frame 16 without altering the spring tension adjustments. This is accomplished simply by lowering the attaching unit 46 on the rod 44 from the position in which it is shown in Figs. 4, 5 and 6 to the position in which it is shown in Fig. 7. It will be noted that this adjustment does not affect the spring tension adjustment previously described in connection with Figs. 5 and 6, and the harrow shown in Fig. 7 will therefore have the same desirable operating characteristics as the harrow shown in Figs. 1 and 2.

From the foregoing description, it will be seen that the stop member 61 on the rod 44 serves two principal purposes, namely: first, as a means for neutralizing the spring load to facilitate hitching of the harrow to and its unhitching from a tractor; and second, as a stop for limiting downward swinging of the rear part of the harrow frame 16 relative to the tongue 17 on the axis of the pivot pins 34.

It should be understood that it is not intended to limit the invention to the particular form and details herein disclosed, and that the invention includes such other forms and modifications as are embraced by the scope of the appended claims.

It is claimed and desired to secure by Letters Patent:

1. A pickup disk harrow attachment for tractors comprising: a rigid harrow frame rotatably mounting front and rear disk gangs in horizontally and vertically fixed relation thereto; a draft tongue adapted for pivotal connection at its forward end in underslung relation to a tractor; pivot means connecting a rearward portion of said draft tongue to a forward portion of said harrow frame for vertical swinging movement relative thereto on a center in upwardly spaced relation to the axis of said front disk gang; load transmitting means cooperable with a tractor mounted lift mechanism and operatively connected with said harrow frame in forwardly spaced relation to said center of said pivot means; lost motion connecting means operatively interposed between said implement frame and said draft tongue so as to permit swinging movement of said implement frame in opposite directions from a horizontal working position to upwardly and downwardly inclined working positions, respectively, while said draft tongue is in an implement lowered position relative to said tractor and so as to limit swinging movement of the rear portion of said implement frame relative to said draft tongue in a downward direction relative to said draft tongue upon adjustment of the latter relative to said tractor into an implement raised position; and resilient means operatively interposed between said implement frame and said draft tongue so as to assist downward swinging movement and to yieldingly resist upward swinging movement of said rear portion of said implement frame from said horizontal working position while said draft tongue is in said implement lower position.

2. A pickup disk harrow attachment as set forth in claim 1 wherein said lost motion connecting means comprises a pair of relatively abuttable stop elements associated, respectively, with said implement frame and draft tongue, and manually operable adjusting means for one of said stop elements permitting movement of said one stop element selectively into and out of load transmitting engagement with the other of said stop elements while said implement frame is in said horizontal working position.

3. A pickup disk harrow attachment as set forth in claim 1 wherein said lost motion connecting means comprise a rod member adjustably connected in load transmitting relation with said draft tongue so as to permit movement of said rod member in the direction of its axis to different positions of adjustment transversely of said draft tongue, and relatively abuttable stop elements associated, respectively, with said rod member and implement frame.

4. A disk harrow attachment as set forth in claim 3 wherein the stop element associated with said implement frame comprises a bracket in overlying relation to said draft tongue, and wherein said rod member extends upwardly from said draft tongue through said bracket and has a stop collar at its upper end in overlying and abuttable relation to said bracket.

5. A disk harrow attachment as set forth in claim 4 wherein said stop collar is adjustably connected in load transmitting relation with said rod member so as to permit movement of said stop collar in the axial direction of said rod member to different operative positions.

6. A disk harrow attachment as set forth in claim 3 wherein said resilient means between said implement frame and draft tongue comprises a coil spring reacting at one of its ends upon said rod member and at its other end upon said implement frame.

7. A disk harrow attachment as set forth in claim 6 wherein a thrust collar affording a seat for said one end of said coil spring is mounted on said rod member for adjustment axially thereof.

8. An agricultural machine of the type wherein a tractor serves as a source of draft for a trailing implement and has a power lift mechanism for raising and lowering said implement, said machine comprising a rigid implement frame, a draft tongue, pivot means connecting said frame at a forward portion of the latter with a rear portion of said draft tongue for relative up and down swinging movement, means detachably connecting a forward portion of said draft tongue with said tractor for vertical swinging movement of said draft tongue between implement lowered and implement raised positions, load transmitting means effectively connecting said power lift mechanism with said implement frame in forwardly spaced relation to the center of said pivot means for producing a downward swinging movement of the rear portion of said implement frame relative to said draft tongue in response to an implement raising actuation of said power lift mechanism, lost motion connecting means operatively interposed between portions of said implement frame and said draft tongue disposed in spaced relation to said center of said pivot means and including parts coacting to permit said frame to swing up and down a limited amount from a horizontal working position relative to said tongue when the latter is in its implement lowered position, and resilient means operatively interposed between said implement frame and said draft tongue so as to assist downward swinging movement and to yieldingly resist upward swinging movement of the rear portion of said implement frame from said horizontal working position while said draft tongue is in said implement lowered position.

References Cited in the file of this patent

UNITED STATES PATENTS

| | | |
|---|---|---|
| 1,243,019 | Waterman | Oct. 16, 1917 |
| 2,462,641 | Hyland | Feb. 22, 1949 |
| 2,482,657 | Court | Sept. 20, 1949 |
| 2,546,461 | Lewis | Mar. 27, 1951 |
| 2,620,718 | Oerman | Dec. 9, 1952 |